(12) United States Patent
Becker

(10) Patent No.: US 7,085,810 B1
(45) Date of Patent: Aug. 1, 2006

(54) DYNAMIC COMMAND SETS IN A COMPUTER MESSAGING SYSTEM IN A METHOD, SYSTEM AND PROGRAM

(75) Inventor: Daniel Otto Becker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1395 days.

(21) Appl. No.: 09/583,519

(22) Filed: May 31, 2000

(51) Int. Cl.
*G06F 15/16* (2006.01)

(52) U.S. Cl. .................. 709/206; 709/217; 709/219

(58) Field of Classification Search .............. 709/1, 709/206; 707/10, 102; 717/148
See application file for complete search history.

(56) References Cited

U.S. PATENT DOCUMENTS

| | | | |
|---|---|---|---|
| 5,434,978 A | 7/1995 | Dockter et al. | 395/200 |
| 5,574,782 A | 11/1996 | Baird et al. | 379/220 |
| 5,845,075 A | 12/1998 | Uhler et al. | 395/200.3 |
| 5,892,950 A | 4/1999 | Rigori et al. | 395/705 |
| 5,920,720 A * | 7/1999 | Toutonghi et al. | 717/148 |
| 5,966,702 A * | 10/1999 | Fresko et al. | 707/10 |
| 6,055,526 A * | 4/2000 | Ambroziak | 707/102 |
| 6,226,752 B1 * | 5/2001 | Gupta et al. | |
| 6,327,701 B1 * | 12/2001 | Ungar | 717/148 |
| 6,366,898 B1 * | 4/2002 | Taivalsaari et al. | 709/206 |
| 6,442,565 B1 * | 8/2002 | Tyra et al. | 707/102 |
| 6,557,023 B1 * | 4/2003 | Taivalsaari | 709/1 |

FOREIGN PATENT DOCUMENTS

JP        09016412        1/1997

* cited by examiner

*Primary Examiner*—Rupal Dharia
*Assistant Examiner*—Quang N. Nguyen
(74) *Attorney, Agent, or Firm*—Marilyn Smith Dawkins; Dillon & Yudell LLP

(57) ABSTRACT

Rather than using a command interpreter or dispatch table, commands within a messaging system are given a name which matches the filename for the class file implementing the command. A command name, or command number, may be subsequently passed to a server in a messaging system and used to dynamically load and instantiate a message command by loading a class of the same name. Additional command classes may therefore be added or deleted, at runtime, from client or server code without halting the application. An error condition is signaled when the command name is unrecognized, when the command code is unavailable or when there are problems instantiating an instance of the command class. Once the class code is loaded, a new instance of the class is created and the command object may be utilized.

11 Claims, 4 Drawing Sheets

```
public SimpleCmd readCommand() throws IOException {
  String commandName = readName();
    try {
        Class cmdClass = classloader.loadClass( commandName);//
ClassNotFoundException
        SimpleCmd cmd = (SimpleCmd) cmdClass.NewInstance();//
           Cms.setArgs( readArgs() );
           return cmd;
      } catch (Exception e) }
         throw new IOException( "unknown command" + commandName);
      } /* endcatch */
      }
```

Figure 3

DYNAMIC COMMAND SETS IN A COMPUTER MESSAGING SYSTEM IN A METHOD, SYSTEM AND PROGRAM

BACKGROUND OF THE INVENTION

1. Technical Field

The present invention generally relates to distributed data processing systems and in particular to client-server data processing systems. Still more particularly, the present invention relates to command sets in a computer messaging system. Further, the present invention relates to modification of command sets on a server in a computer network.

2. Description of the Related Art

In the area of client-server computing, many computers interact over a computer network through messaging systems. Messages containing code define commands that a client may issue to the server computer to perform tasks on the server, such as accessing databases, starting a process, sorting search results, connecting to other computers, retrieving email, etc.

Typically, function codes and parameters are encoded in application-specific form. Frequently, the encoding process arranges function codes in a fixed order and with a fixed offset from the beginning of a message. The meaning of the function code and the interpretation of parameters is known only by the sending and receiving applications. As new releases of applications are prepared, encoding schemes used for function codes may vary. Updating sending and receiving (messaging) applications thus can become a continuous and complex task—especially in widely distributed systems.

Whether done by client or server, often there is a function that converts "gestures" or other input into these messages. This function is commonly known as a dispatch table or a command interpreter. An example of such a command interpreter function in the Java programming language is given in Table 1.

TABLE 1

```
public SimpleCmd readCommand( ) throws IOException{
SimpleCmd cdm;
String commandName = readName( ) ;
    if (  commandName.equalsIgnoreCase( "AddCmd" ) ) {
        cmd = new AddCmd( ) ;
    }   else if (commandName.equalsIgnoreCase( "DeleteCmd" ) ) {
        cmd = new DeletCmd( ) ;
    }   else if (commandName.equalsIgnoreCase( "GetCmd" ) ) {
        cmd = new GetCmd( ) ;
    }   else if (commandName.equalsIgnoreCase( "PostCmd" ) ) {
        cmd = new PostCmd( ) ;
    }   else if (commandName.equalsIgnoreCase( "DoneCmd" ) ) {
        cmd = new DoneCmd( ) ;
    }   else
    throw new IOException( "unknown command " + commandName ) ;
    cmd.setArgs( readArgs( ) ) ;
    return cmd;
```

The purpose of this function is to take a command name, given as a string, and find and instantiate a command object that will perform the command. The drawback to this type of dispatch table is the hard-coded nature of the command set. This example tests for five commands, but any commands that are not explicitly coded in the function are ignored and an error condition is signaled. If ever the system needed an additional command, the client or the server would have to be halted while new code is installed on the system.

There are other messaging systems that refer to commands by number rather than a name to reduce traffic congestion. This saves more network bandwidth than sending the command name, but the same problems of static rather than dynamic tables exist. Another type of messaging system creates a command on the client side and sends the entire command object to the server. This is known as command serialization or command marshalling/unmarshalling, and can tax network bandwidth.

There are a variety of situations in which it would be preferable not to halt the system to install new object code for the command interpreter or dispatch table. Most common are commercial sales applications on the Internet, which may experience heavy, round-the-clock traffic. Taking a sales application off-line for an upgrade may result in lost revenue due to customer disaffection.

It would therefore be desirable to provide a method and system that would allow new commands to be installed without pausing either the client or server computer. Also, it would be desirable to enlarge or reduce a command set without recompiling the code that contains the dispatch table.

SUMMARY OF THE INVENTION

It is therefore one object of the present invention to enlarge or reduce a command set without pausing a server computer.

It is another object of the present invention to provide a method that will enlarge or reduce a command set without pausing a client computer and without recompiling code that contains a dispatch table.

The foregoing objects are achieved as is now described. Rather than using a command interpreter or dispatch table, commands within a messaging system are given a name which matches the filename for the class file implementing the command. A command name, or command number, may be subsequently passed to a server in a messaging system and used to dynamically load and instantiate a message command by loading a class of the same name. Additional command classes may therefore be added or deleted, at runtime, from client or server code without halting the application. An error condition is signaled when the command name is unrecognized, when the command code is unavailable or when there are problems instantiating an instance of the command class. Once the class code is loaded, a new instance of the class is created and the command object may be utilized.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 depicts an example of pseudo-code in the Java programming language for employing commands which may be dynamically updated at run-time in accordance with a preferred embodiment of the present invention.

DETAILED DESCRIPTION OF THE PREFERRED EMBODIMENT

Figure 1:
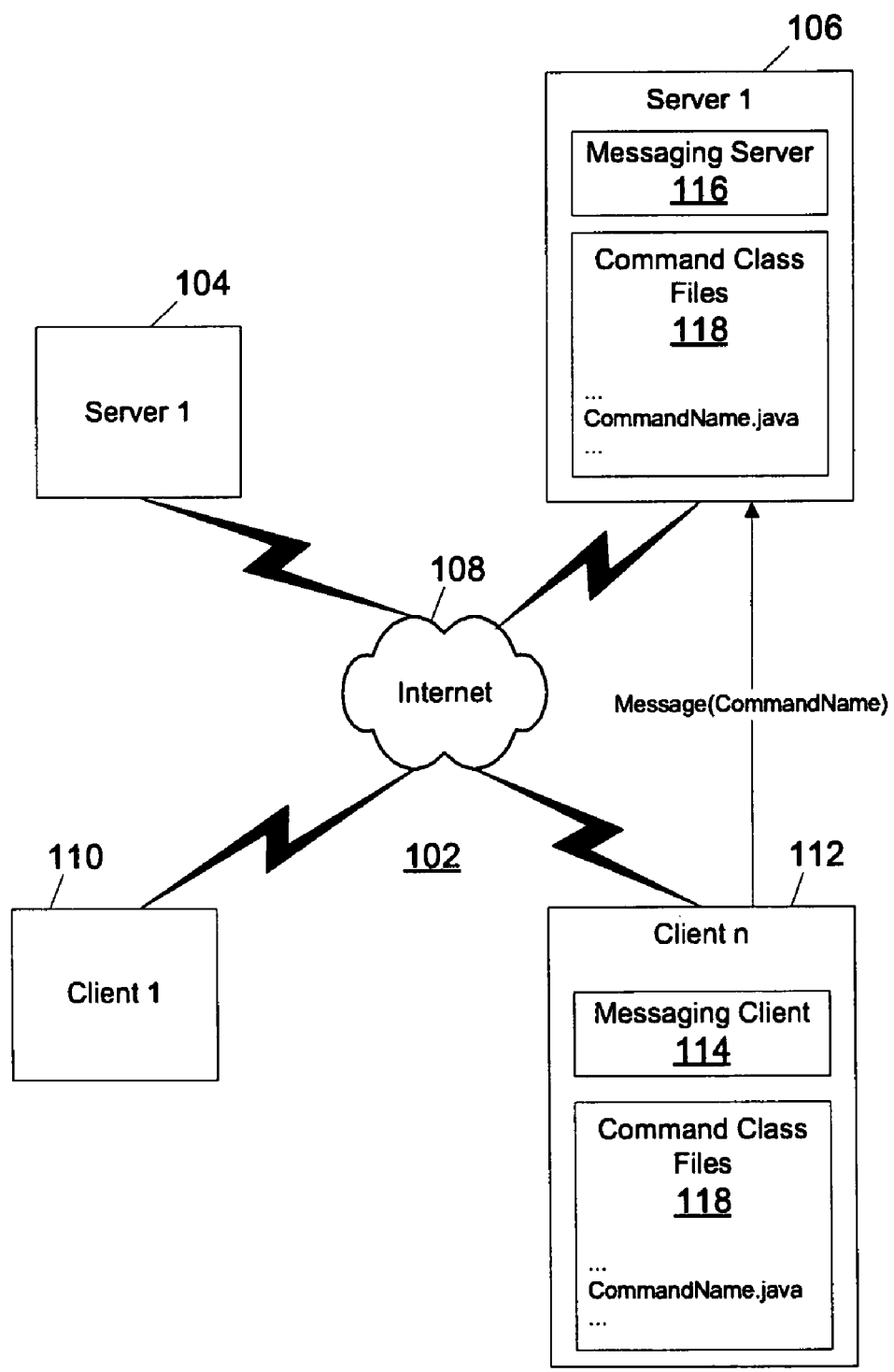
FIG. 1 depicts a high-level block diagram of a data processing system network in which a preferred embodiment of the present invention may be implemented.

With reference now to the figures, and in particular with reference to FIG. 1, a high-level block diagram of a data processing system network in which a preferred embodiment of the present invention may be implemented is depicted. Data processing system network 102 includes one or more servers 104–106 which are accessible as part of the Internet 108 or other network. Data processing system network 102 also includes one or more clients 110–112 which may access or receive content from servers 104–106. The content may be accessed using any of a variety of messaging system protocols including HyperText Transfer Protocol (HTTP), File Transfer Protocol (FTP), Network News Transfer Protocol (NNTP), Internet Mail Access Protocol (IMAP) or Post Office Protocol (POP).

In accordance with the present invention, a client within data processing system network 102, such as client 112, includes a messaging system client application 114 (e.g., a browser) capable of transmitting messages containing commands to a messaging system server application 116 within a server, such as server 106, within data processing system network 102. The commands are issued by client application 114 to server application 116 in order to cause some operation to be performed by server 106.

In object oriented programs, such as Java programs, commands are typically generated by clients and issued to a server via a messaging system. A function on the client or server known as a dispatch table or a command interpreter is utilized to take a command and instantiate a command object to ultimately perform the command. If a particular command is not coded in the table or interpreter, the command is ignored and an error condition is signaled. The structures of prior art systems prevent commands, that are not already loaded on the system, from being issued. If a system needed an additional command object, the client or server would have to be halted while new code is installed on the server.

The present invention allows dynamic addition of commands, by loading of new class files, without requiring a system halt or recompiling of a dispatch table. The messaging system of the present invention utilizes commands which have the same name as the filename for the class file containing the source code implementing the command, excluding the filename extension (e.g., ".java"). Thus, for example the command "commandName" corresponds to, and is implemented by source code within, the class file "commandName.java". Command names are transmitted within messages from, for instance, client application 114 to server application 116. The command set supported by either client 114 or server 116, which is defined by the common set of command class files 118 within both systems, may be updated dynamically, without halting the messaging system or application. Rather than shutting down the system, the present invention provides for loading a class file for the new command object at runtime with no need for shutting down the system. A class file for the new command may then be transmitted to the client and/or server. A command object may be instantiated from the class file as necessary, thus eliminating system downtime for a new command.

Figure 2A:
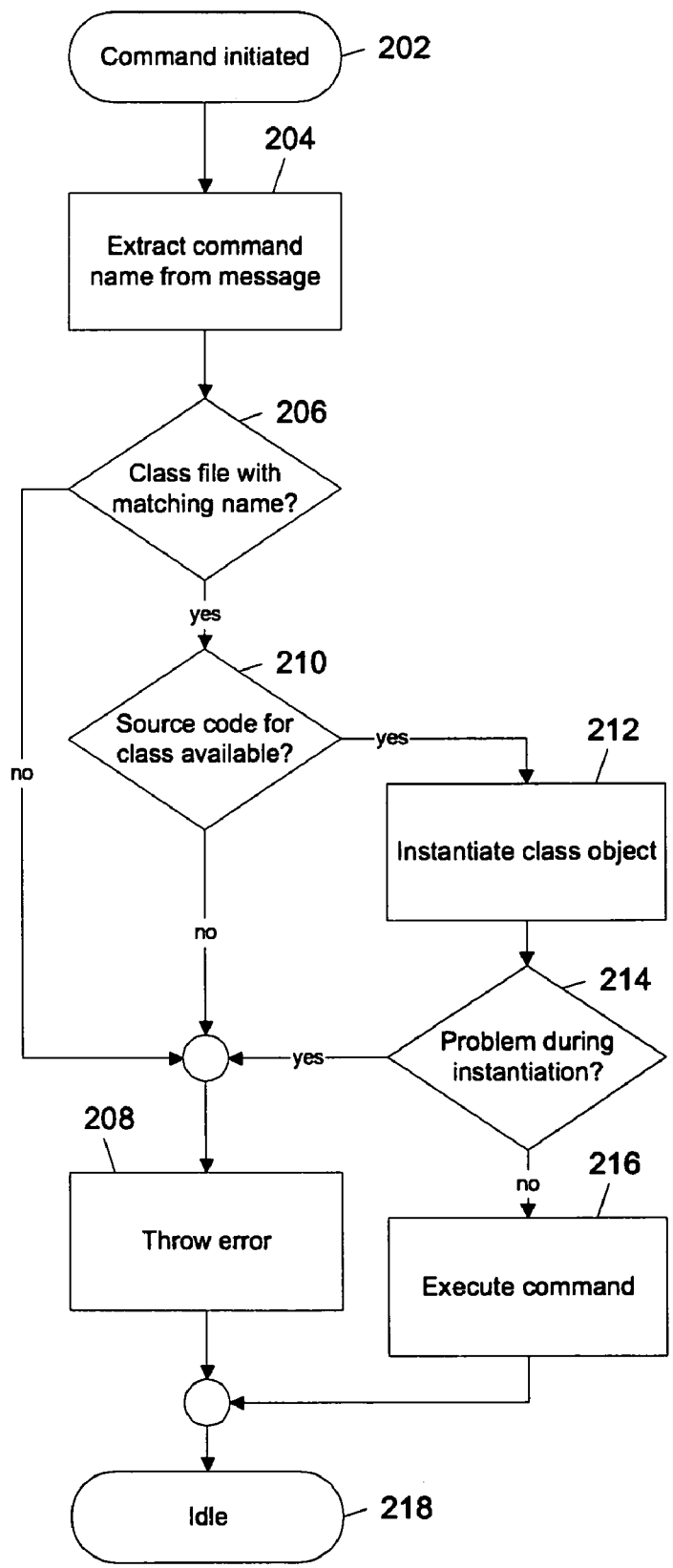
FIGS. 2A–2B are high-level flow diagrams for processes of providing dynamic command sets in a computer messaging system and updating the system with new commands in accordance with a preferred embodiment of the present invention.
Figure 2B:
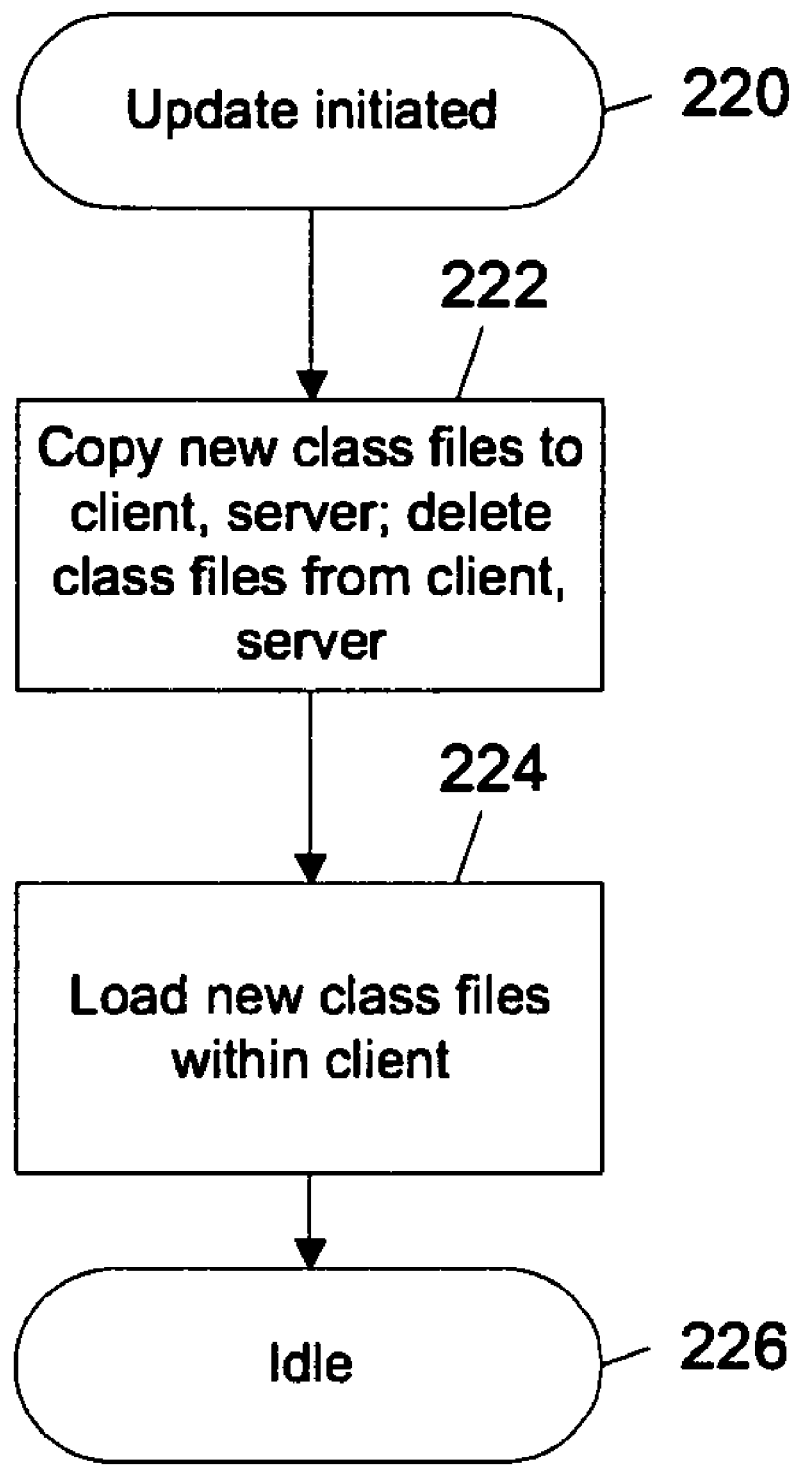

Referring now to FIGS. 2A–2B, high-level flow diagrams for processes of providing dynamic command sets in a computer messaging system in accordance with a preferred embodiment of the present invention are illustrated. FIG. 2A illustrates a process for employing commands within a message system in accordance with the present invention. The process begins with step 202, which depicts a command name being sent, via a messaging system, to a server to be used to load a class of the same name (except for the filename extension). In Java, employed in the exemplary embodiment of the present invention, and in several other computer languages, a ClassLoader is used to load classes dynamically at run time. Once the class code is loaded, a new instance of the class may be created and the command implemented by the class may be executed. An error condition is signaled if the command name is not recognized.

The process thus passes to step 204, which illustrates extracting the command name from the message transmitted from the client to the server within the messaging system, and then to step 206, which depicts a determination of whether the command name is recognized by the system (i.e., whether a class file having a matching name can be located). If the command name is not recognized, the process proceeds to step 208, which illustrates the system throwing an error signal. New class files may then be dynamically loaded from a predesignated source to accommodate the new command.

Returning to step 206, if the command name is recognized (found to match a class filename, except for the extension), the process proceeds instead to step 210, which depicts a determination of whether the class file source code is available. If the class file source code corresponding to the transmitted command name is not available, the process proceeds to step 208, which depicts the system throwing an error. Again, source code for the required class file may optionally be downloaded from a predesignated source.

If the class file source code is available, the process proceeds instead to step 212, which illustrates instantiating the class file corresponding to the command, and then to step 214, which depicts a determination of whether any problems occurred during instantiation of the class. If so, the process proceeds to step 208, which illustrates the system throwing an error. Otherwise, the process proceeds instead to step 216, which depicts executing the command. From either of steps 208 or 216, the process passes to step 218, which illustrates the process becoming idle until another command is received via the messaging system.

FIG. 2B illustrates a process for updating the messaging system with new commands in accordance with the present invention. The process begins with step 220, which depicts an update of the command set being initiated. The process first passes to step 222, which illustrates copying new class files for the new command to the client and server or deleting class files for discontinued commands from the client and server, then to step 224, which depicts loading the new class files within the server. This occurs at runtime, with additional command classes being added to or removed from the client or server code without recompiling any code for a command interpreter or dispatch table. The process then passes to step 226, which illustrates the process becoming idle until another update is initiated.

Referring now to FIG. 3, an example of pseudo-code in the Java programming language for employing commands which may be dynamically updated at run-time in accordance with a preferred embodiment of the present invention is depicted. In the pseudo-code, 'commandName' is used to load a class of the same name. The command name that is passed in the message system is used to dynamically load and instantiate the message command. Once the class code is loaded, a new instance of the class is created. If 'commandName' is unrecognized, an error condition is signaled. A similar error is generated if 'commandName' is unavailable on the system. However, in the present invention, the dispatch table is not necessary, nor is halting the system, as command classes are loaded dynamically in client or server code.

The present invention has several advantages. Commands may be added or deleted at runtime without recompiling code. Command classes may be added or removed, dynamically, in the client or server code. Maintenance costs are lessened and code is less prone to error when introducing new commands. There is no dispatch table to recompile, nor is there a command list to maintain.

Also, the present invention has an additional advantage in that sending a command name over a network requires fewer bytes than sending an entire serialized class. Other messaging systems refer to commands by number rather than name. Dynamic command sets, in the present invention, may also refer to each command by number by returning a command identification number to the client for future use.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for generating a command in a computer messaging system, comprising the steps of:
   receiving a command name at a server via said messaging system, said command name being sent by a client to initiate a particular one of multiple server functions identified by an executable having a name synonymous with said command name;
   utilizing said command name to automatically load a class file having a name including said command name; and
   dynamically executing functions, on server, associated with said class file.

2. The method of claim 1, further comprising:
   comparing said command name to existing classes on said server;
   when said command name does not match a name of an existing class, creating a new instance of said class; and
   executing said new instance of said class.

3. The method of claim 1, further comprising:
   deleting a current command at runtime.

4. The method of claim 1, further comprising:
   adding a new command at runtime; and
   when a class file associated with said new command is available at a source other than said server, which is accessible from said server, dynamically loading said class file from said source and instantiating functions of said class file on said server.

5. In a computer system connected to at least one other network computer system, a method for employing a command in a messaging system operating on said computer system, said method comprising the steps of:
   selecting a command desired to be executed at the network computer system connected to said computer system, wherein said network computer system comprises a set of class files that carry out specific functions when initiated; and
   transmitting, within a message to the network system in which the selected command is to be executed, a command name for the selected command which matches a portion of a class filename for a class implementing the selected command, wherein said selected command triggers an activation and execution at said network system of functions associated with said class;
   comparing said command name to existing classes on said messaging system;
   when said command name does not match any one of said existing classes, creating a new instance of said class; and
   executing said new instance of said class.

6. A method for employing a command in a computer network, said method comprising:
   receiving a message containing a command name; and
   comparing said command name to existing said class files;
   locating a class file having an executable class filename that is substantially similar to said command name;
   loading and instantiating said class file and functions provided thereby; and
   when said command name does not match any one of sad existing classes, executing a new instance of said class.

7. In a computer system connected to a network computer, a system for generating a command response, comprising:
   selection means for selecting a command to be executed within a computer network;
   transmission means for sending a command name within a message to the network computer, such that said command name causes and execution of said selected command, which matches a portion of a class filename for a class implementing said selected command;
   means for adding a new command at runtime; and
   means, when a class file associated with said new command is available at a source other than said server, which is accessible from said server, for dynamically loading said class file from said source and instantiating functions of said class file on said server.

8. The system of claim 7, further comprising:
   means for comparing said command name to existing classes;
   means for loading said class file having said command name;
   means for creating a new instance of said class when said class cannot be loaded by said system; and
   execution means for executing said new instance of said class.

9. The system of claim 7, further comprising:

means for deleting a current command at runtime.

10. A computer program product within a computer readable medium having instructions for employing a command in a messaging system, comprising:

instructions within said computer program product for selecting a command to be executed;

instructions within said computer program product for transmitting, within a message to a system in which the selected command is to be executed, a command name for the selected command which matches a portion of a class filename for a class implementing the selected command, wherein said command name triggers an execution of a related function of said class when received at a recipient computer system;

instructions within said computer program product for comparing said command name to existing classes on said server;

instructions within said computer program product for loading said class file having said command name;

instructions within said computer program product for creating a new instance of said class; and instructions within said computer program product for executing said new instance of said class.

11. The computer program product of claim 10, further comprising:

instructions within said computer program product for deleting a current command at runtime.

* * * * *